United States Patent [19]

Tai

[11] Patent Number: 5,200,831
[45] Date of Patent: Apr. 6, 1993

[54] METHOD AND ARRANGEMENT FOR LOCALLY SWITCHING GRAY DOT TYPES TO REPRODUCE AN IMAGE WITH GRAY LEVEL PRINTING

[75] Inventor: Hwai-Tzuu Tai, Rochester, N.Y.

[73] Assignee: Eastman Kodak Company, Rochester, N.Y.

[21] Appl. No.: 895,555

[22] Filed: Jun. 5, 1992

[51] Int. Cl.$^5$ ............................................. H04N 1/23
[52] U.S. Cl. .................................... 358/298; 358/455; 358/457; 358/458; 358/459; 358/462; 358/465
[58] Field of Search ............... 358/300, 296, 298, 455, 358/456, 457, 458, 459, 462, 465, 466; 346/160; 382/50

[56] References Cited

U.S. PATENT DOCUMENTS 4,741,046  4/1988  Matsunawa ...................... 358/456
4,814,886  3/1989  Kuge .................................. 358/298
5,075,780  12/1991  Shibahara ........................ 358/298

Primary Examiner—Benjamin R. Fuller
Assistant Examiner—Scott A. Rogers
Attorney, Agent, or Firm—Norman Rushefsky

[57] ABSTRACT

A method and arrangement for reproducing an original image scans an original image to digitize the image so as to produce a digitized image signal, and collects statistical information of dot regions from the digitized image signal. For each dot region of the digitized image signal, a dot type is selected to render that dot region in accordance with the statistical information, the dot type being either a mixed dot type or one of a fixed threshold or a partial dot type. A printer is controlled to print the digitized image signal by rendering the dot regions in accordance with the selected dot type for each dot region, so that an original image that may contain different types of image regions is satisfactorily reproduced.

8 Claims, 11 Drawing Sheets

| LEVEL 1 | | | | | LEVEL 5 | | | |
|---|---|---|---|---|---|---|---|---|
| 43 | 36 | 22 | 8 | | 47 | 40 | 26 | 12 |
| 15 | ① | 29 | 50 | | 19 | 5 | 33 | 54 |
| 22 | 8 | 43 | 36 | | 26 | 12 | 47 | 40 |
| 29 | 50 | 15 | 1 | | 33 | 54 | 19 | 5 |

30 points to LEVEL 1.

| LEVEL 2 | | | | | LEVEL 6 | | | |
|---|---|---|---|---|---|---|---|---|
| 44 | 37 | 23 | 9 | | 48 | 41 | 27 | 13 |
| 16 | 2 | 30 | 51 | | 20 | 6 | 34 | 55 |
| 23 | 9 | 44 | 37 | | 27 | 13 | 48 | 41 |
| 30 | 51 | 16 | 2 | | 34 | 55 | 20 | 6 |

| LEVEL 3 | | | | | LEVEL 7 | | | |
|---|---|---|---|---|---|---|---|---|
| 45 | 38 | 24 | 10 | | 49 | 42 | 28 | 14 |
| 17 | 3 | 31 | 52 | | 21 | 7 | 35 | 56 |
| 24 | 10 | 45 | 38 | | 28 | 14 | 49 | 42 |
| 31 | 52 | 17 | 3 | | 35 | 56 | 21 | 7 |

| LEVEL 4 | | | |
|---|---|---|---|
| 46 | 39 | 25 | 11 |
| 18 | 4 | 32 | 53 |
| 25 | 11 | 46 | 39 |
| 32 | 53 | 18 | 4 |

| LEVEL 1 | | | | | LEVEL 5 | | | |
|---|---|---|---|---|---|---|---|---|
| 7 | 6 | 4 | 2 | | 39 | 38 | 36 | 34 |
| 3 | ① | 5 | 8 | | 35 | 33 | 37 | 40 |
| 4 | 2 | 7 | 6 | | 36 | 34 | 39 | 38 |
| 5 | 8 | 3 | 1 | | 37 | 40 | 35 | 33 |

| LEVEL 2 | | | | | LEVEL 6 | | | |
|---|---|---|---|---|---|---|---|---|
| 15 | 14 | 12 | 10 | | 47 | 46 | 44 | 42 |
| [11] | [9] | [13] | 16 | | 43 | 41 | 45 | 48 |
| [12] | [10] | 15 | 14 | | 44 | 42 | 47 | 46 |
| 13 | 16 | 11 | 9 | | 45 | 48 | 43 | 41 |

| LEVEL 3 | | | | | LEVEL 7 | | | |
|---|---|---|---|---|---|---|---|---|
| 23 | 22 | 20 | 18 | | 55 | 54 | 52 | 50 |
| 19 | 17 | 21 | 24 | | 51 | 49 | 53 | 56 |
| 20 | 18 | 23 | 22 | | 52 | 50 | 55 | 54 |
| 21 | 24 | 19 | 17 | | 53 | 56 | 51 | 49 |

| LEVEL 4 | | | |
|---|---|---|---|
| 31 | 30 | 28 | 26 |
| 27 | 25 | 29 | 32 |
| 28 | 26 | 31 | 30 |
| 29 | 32 | 27 | 25 |

FIG. 6

LEVEL 1

| 31 | 26 | 16 | 6 |
|----|----|----|---|
| 11 | ① | 21 | 36 |
| 16 | [6] | 31 | 26 |
| 21 | 36 | 11 | 1 |

LEVEL 2

| 32 | 27 | 17 | 7 |
|----|----|----|---|
| 12 | 2 | 22 | 37 |
| 17 | 7 | 32 | 27 |
| 22 | 37 | 12 | 2 |

LEVEL 3

| 33 | 28 | 18 | 8 |
|----|----|----|---|
| 13 | 3 | 23 | 38 |
| 18 | 8 | 33 | 28 |
| 23 | 38 | 13 | 3 |

LEVEL 4

| 34 | 29 | 19 | 9 |
|----|----|----|---|
| 14 | 4 | 24 | 39 |
| 19 | 9 | 34 | 29 |
| 24 | 39 | 14 | 4 |

LEVEL 5

| 35 | 30 | 20 | 10 |
|----|----|----|----|
| 15 | 5 | 25 | 40 |
| 20 | 10 | 35 | 30 |
| 25 | 40 | 15 | 5 |

LEVEL 6

| 47 | 46 | 44 | 42 |
|----|----|----|----|
| 43 | 41 | 45 | 48 |
| 44 | 42 | 47 | 46 |
| 45 | 48 | 43 | 41 |

LEVEL 7

| 55 | 54 | 52 | 50 |
|----|----|----|----|
| 51 | 49 | 53 | 56 |
| 52 | 50 | 55 | 54 |
| 53 | 56 | 51 | 49 |

FIG. 7

| THRESHOLD LEVEL 1 | | | | THRESHOLD LEVEL 6 | | | | THRESHOLD LEVEL 11 | | | |
|---|---|---|---|---|---|---|---|---|---|---|---|
| 56 | 67 | 34 | 12 | 61 | 72 | 39 | 17 | 66 | 77 | 44 | 22 |
| 23 | 1 | 45 | 78 | 28 | 6 | 50 | 83 | 33 | 11 | 55 | 88 |
| 34 | 12 | 56 | 67 | 39 | 17 | 61 | 72 | 44 | 22 | 66 | 77 |
| 45 | 78 | 23 | 1 | 50 | 83 | 28 | 6 | 55 | 88 | 33 | 11 |

| THRESHOLD LEVEL 2 | | | | THRESHOLD LEVEL 7 | | | | THRESHOLD LEVEL 12 | | | |
|---|---|---|---|---|---|---|---|---|---|---|---|
| 57 | 68 | 35 | 13 | 62 | 73 | 40 | 18 | 94 | 95 | 92 | 90 |
| 24 | 2 | 46 | 79 | 29 | 7 | 51 | 84 | 91 | 89 | 93 | 96 |
| 35 | 13 | 57 | 68 | 40 | 18 | 62 | 73 | 92 | 90 | 94 | 95 |
| 46 | 79 | 24 | 2 | 51 | 84 | 29 | 7 | 93 | 96 | 91 | 89 |

| THRESHOLD LEVEL 3 | | | | THRESHOLD LEVEL 8 | | | | THRESHOLD LEVEL 13 | | | |
|---|---|---|---|---|---|---|---|---|---|---|---|
| 58 | 69 | 36 | 14 | 63 | 74 | 41 | 19 | 102 | 103 | 100 | 98 |
| 25 | 3 | 47 | 80 | 30 | 8 | 52 | 85 | 99 | 97 | 101 | 104 |
| 36 | 14 | 58 | 69 | 41 | 19 | 63 | 74 | 100 | 98 | 102 | 103 |
| 47 | 80 | 25 | 3 | 52 | 85 | 30 | 8 | 101 | 104 | 99 | 97 |

| THRESHOLD LEVEL 4 | | | | THRESHOLD LEVEL 9 | | | | THRESHOLD LEVEL 14 | | | |
|---|---|---|---|---|---|---|---|---|---|---|---|
| 59 | 70 | 37 | 15 | 64 | 75 | 42 | 20 | 110 | 111 | 108 | 106 |
| 26 | 4 | 48 | 81 | 31 | 9 | 53 | 86 | 107 | 105 | 109 | 112 |
| 37 | 15 | 59 | 70 | 42 | 20 | 64 | 75 | 108 | 106 | 110 | 111 |
| 48 | 81 | 26 | 4 | 53 | 86 | 31 | 9 | 109 | 112 | 107 | 105 |

| THRESHOLD LEVEL 5 | | | | THRESHOLD LEVEL 10 | | | | THRESHOLD LEVEL 15 | | | |
|---|---|---|---|---|---|---|---|---|---|---|---|
| 60 | 71 | 38 | 16 | 65 | 76 | 43 | 21 | 118 | 119 | 116 | 114 |
| 27 | 5 | 49 | 82 | 32 | 10 | 54 | 87 | 115 | 113 | 117 | 120 |
| 38 | 16 | 60 | 71 | 43 | 21 | 65 | 76 | 116 | 114 | 118 | 119 |
| 49 | 82 | 27 | 5 | 54 | 87 | 32 | 10 | 117 | 120 | 115 | 113 |

FIG. 8

| THRESHOLD LEVEL 1 | | | | THRESHOLD LEVEL 2 | | | | THRESHOLD LEVEL 3 | | | | THRESHOLD LEVEL 4 | | | |
|---|---|---|---|---|---|---|---|---|---|---|---|---|---|---|---|
| 71 | 48 | 107 | 190 | 69 | 47 | 106 | 185 | 69 | 47 | 104 | 179 | 64 | 46 | 103 | 173 |
| 128 | 249 | 89 | 38 | 126 | 243 | 88 | 37 | 124 | 238 | 86 | 35 | 122 | 231 | 84 | 34 |
| 107 | 190 | 71 | 48 | 106 | 185 | 69 | 47 | 104 | 179 | 66 | 47 | 103 | 173 | 64 | 46 |
| 89 | 38 | 128 | 249 | 88 | 37 | 126 | 243 | 86 | 35 | 124 | 238 | 84 | 34 | 122 | 231 |

| THRESHOLD LEVEL 5 | | | | THRESHOLD LEVEL 6 | | | | THRESHOLD LEVEL 7 | | | | THRESHOLD LEVEL 8 | | | |
|---|---|---|---|---|---|---|---|---|---|---|---|---|---|---|---|
| 61 | 45 | 101 | 167 | 59 | 44 | 100 | 161 | 57 | 44 | 98 | 156 | 54 | 43 | 97 | 153 |
| 120 | 224 | 83 | 34 | 118 | 217 | 82 | 33 | 116 | 212 | 80 | 32 | 114 | 209 | 79 | 32 |
| 101 | 167 | 61 | 45 | 100 | 161 | 59 | 44 | 98 | 156 | 57 | 44 | 97 | 153 | 54 | 43 |
| 83 | 34 | 120 | 224 | 82 | 33 | 118 | 217 | 80 | 32 | 116 | 212 | 79 | 32 | 114 | 209 |

| THRESHOLD LEVEL 9 | | | | THRESHOLD LEVEL 10 | | | | THRESHOLD LEVEL 11 | | | | THRESHOLD LEVEL 12 | | | |
|---|---|---|---|---|---|---|---|---|---|---|---|---|---|---|---|
| 53 | 42 | 95 | 151 | 51 | 41 | 94 | 146 | 50 | 40 | 92 | 142 | 49 | 40 | 91 | 135 |
| 113 | 205 | 78 | 31 | 111 | 202 | 77 | 30 | 110 | 198 | 75 | 29 | 108 | 195 | 74 | 28 |
| 95 | 151 | 53 | 42 | 94 | 146 | 51 | 41 | 92 | 142 | 50 | 40 | 91 | 135 | 49 | 40 |
| 79 | 31 | 113 | 205 | 77 | 30 | 111 | 202 | 75 | 29 | 110 | 198 | 74 | 28 | 108 | 195 |

| THRESHOLD LEVEL 13 | | | | THRESHOLD LEVEL 14 | | | | THRESHOLD LEVEL 15 | | | | THRESHOLD LEVEL 16 |
|---|---|---|---|---|---|---|---|---|---|---|---|---|
| 19 | 18 | 22 | 25 | 12 | 12 | 14 | 15 | 9 | 8 | 10 | 11 | |
| 24 | 27 | 20 | 17 | 15 | 16 | 13 | 12 | 11 | 11 | 10 | 8 | |
| 22 | 25 | 19 | 18 | 14 | 15 | 12 | 12 | 10 | 10 | 9 | 8 | |
| 20 | 17 | 24 | 27 | 13 | 12 | 15 | 16 | 10 | 8 | 11 | 11 | |

FIG. 9

| THRESHOLD LEVEL 1 | | | | | | THRESHOLD LEVEL 2 | | | | | | THRESHOLD LEVEL 3 | | | | | | THRESHOLD LEVEL 4 | | | | | |
|---|---|---|---|---|---|---|---|---|---|---|---|---|---|---|---|---|---|---|---|---|---|---|---|
| 179 | 179 | 179 | 179 | 179 | 179 | 142 | 142 | 142 | 142 | 142 | 142 | 122 | 122 | 122 | 122 | 122 | 122 | 110 | 110 | 110 | 110 | 110 | 110 |
| 179 | 179 | 179 | 179 | 179 | 179 | 142 | 142 | 142 | 142 | 142 | 142 | 122 | 122 | 122 | 122 | 122 | 122 | 110 | 110 | 110 | 110 | 110 | 110 |
| 179 | 179 | 179 | 179 | 179 | 179 | 142 | 142 | 142 | 142 | 142 | 142 | 122 | 122 | 122 | 122 | 122 | 122 | 110 | 110 | 110 | 110 | 110 | 110 |

| THRESHOLD LEVEL 5 | | | | | | THRESHOLD LEVEL 6 | | | | | | THRESHOLD LEVEL 7 | | | | | | THRESHOLD LEVEL 8 | | | | | |
|---|---|---|---|---|---|---|---|---|---|---|---|---|---|---|---|---|---|---|---|---|---|---|---|
| 101 | 101 | 101 | 101 | 101 | 101 | 89 | 89 | 89 | 89 | 89 | 89 | 78 | 78 | 78 | 78 | 78 | 78 | 68 | 68 | 68 | 68 | 68 | 68 |
| 101 | 101 | 101 | 101 | 101 | 101 | 89 | 89 | 89 | 89 | 89 | 89 | 78 | 78 | 78 | 78 | 78 | 78 | 68 | 68 | 68 | 68 | 68 | 68 |
| 101 | 101 | 101 | 101 | 101 | 101 | 89 | 89 | 89 | 89 | 89 | 89 | 78 | 78 | 78 | 78 | 78 | 78 | 68 | 68 | 68 | 68 | 68 | 68 |

| THRESHOLD LEVEL 9 | | | | | | THRESHOLD LEVEL 10 | | | | | | THRESHOLD LEVEL 11 | | | | | | THRESHOLD LEVEL 12 | | | | | |
|---|---|---|---|---|---|---|---|---|---|---|---|---|---|---|---|---|---|---|---|---|---|---|---|
| 58 | 58 | 58 | 58 | 58 | 58 | 48 | 48 | 48 | 48 | 48 | 48 | 40 | 40 | 40 | 40 | 40 | 40 | 27 | 27 | 27 | 27 | 27 | 27 |
| 58 | 58 | 58 | 58 | 58 | 58 | 48 | 48 | 48 | 48 | 48 | 48 | 40 | 40 | 40 | 40 | 40 | 40 | 27 | 27 | 27 | 27 | 27 | 27 |
| 58 | 58 | 58 | 58 | 58 | 58 | 48 | 48 | 48 | 48 | 48 | 48 | 40 | 40 | 40 | 40 | 40 | 40 | 27 | 27 | 27 | 27 | 27 | 27 |

| THRESHOLD LEVEL 13 | | | | | | THRESHOLD LEVEL 14 | | | | | | THRESHOLD LEVEL 15 | | | | | | THRESHOLD LEVEL 16 |
|---|---|---|---|---|---|---|---|---|---|---|---|---|---|---|---|---|---|---|
| 18 | 18 | 18 | 18 | 18 | 18 | 13 | 13 | 13 | 13 | 13 | 13 | 8 | 8 | 8 | 8 | 8 | 8 | |
| 18 | 18 | 18 | 18 | 18 | 18 | 13 | 13 | 13 | 13 | 13 | 13 | 8 | 8 | 8 | 8 | 8 | 8 | |
| 18 | 18 | 18 | 18 | 18 | 18 | 13 | 13 | 13 | 13 | 13 | 13 | 8 | 8 | 8 | 8 | 8 | 8 | |

FIG. 10

METHOD AND ARRANGEMENT FOR LOCALLY SWITCHING GRAY DOT TYPES TO REPRODUCE AN IMAGE WITH GRAY LEVEL PRINTING

This invention is related to the following applications, filed on even date with the present application: U.S. Ser. No. 07/894,858, for Classification to Change Exposure Within a Cell of Different Pixels; U.S. Ser. No. 07/894,857, for Halftone Dot Arrangement in Gray Level Halftone Printing; U.S. Ser. No. 07/894,859, for A Method and Arrangement For Providing a Default Mode in Digital Copying; U.S. Ser. No. 07/895,986, for An Image Processing Method to Remove Halftone Screens; U.S. Ser. No. 07/895,985, for Multi-Bit Rendering Method and Arrangement for Continuous Tone Picture Representation and Printing; U.S. Ser. No. 07/895,554, for A Method and Apparatus For Imbedding Controlled Structure For Gray Scale Rendering; and U.S. Ser. No. 07/895,988, for Line Screen Design for Gray Scale Rendering. Each of these related applications is hereby expressly incorporated by reference into this application.

FIELD OF THE INVENTION

The present invention relates to the field of encoding pictorial imagery for reproduction on display or printing systems, and more particularly, to selecting a dot type in a display or printing arrangement that uses gray level display/printing.

BACKGROUND OF THE INVENTION

In the area of digital printing (the term "printing" is used to encompass both printing and displaying throughout), gray level has been achieved in a number of different manners. The representation of the intensity, i.e., the gray level, of a color by binary displays and printers has been the object of a variety of algorithms. Binary displays and printers are capable of making a mark, usually in the form of a dot, of a given, uniform mark, usually in the form of a dot, of a given, uniform size and at a specified resolution in marks per unit length, typically dots per inch. It has been common to place the marks according to a variety of geometrical patterns such that a group of marks when seen by the eye gives a rendition of an intermediate color tone between the color of the background (usually white paper stock) and total coverage, or solid density.

Continuous tone images contain an apparent continuum of gray levels. As an approximation to continuous tone images, pictorial imagery has been represented via binary halftone technologies. In order to record or display a halftone image with a scanning system, one picture element of the recording or display surface consists of a j×k matrix of sub-elements where j and k are positive integers. A halftone image is reproduced by printing the respective sub-elements or leaving them blank, in other words, by suitably distributing the printed marks.

Halftone image processing algorithms are evaluated in part, by their capability of delivering a complete gray scale at normal viewing distances. The capability of a particular process to reproduce high frequency rendition (fine detail) with high contrast modulation makes that procedure superior to one which reproduces such fine detail with lesser or no output contrast.

Another method of producing gray levels is provided by gray level printing. In such a method, each pixel has the capability to render several different dot sizes. The dot size for a pixel is a function of the exposure time provided an LED element corresponding to that pixel. The longer the exposure time, the more toner is attracted to that particular pixel. See, for example, U.S. Pat. No. 4,680,645 for a method of rendering gray scale images with variable dot sizes.

There are two major concerns in rendering a continuous tone image for printing: (1) the resolution of image details, and (2) the reproduction of gray scales. In a binary halftone representation scheme, these two fundamental factors compete with each other. The more gray levels that are rendered, the larger is the halftone cell. Consequently, coarse halftone line screens are provided, with the attendant poor image appearance. Hence, a compromise is made in rendering between the selection of line resolution and gray scales in binary halftone printing. However, in gray level halftone printing, one can satisfy both resolution and gray level requirements. In gray level printing, the same number of addressable dots are present, and there is a choice of dot sizes from one dot-size of 1 bit/pixel to 16 different dot-sizes of 4 bit/pixel. An image could then be rendered with 133 line screens and 128 gray scales of higher quality image. Although providing higher image quality with respect to line resolution and tonal scales, gray level halftoning presents its own dot rendering issues.

A problem exists in the application of a gray level rendering technique to a document that contains different types of images: text, halftone, and continuous tone. These different types of images create different rendering problems, based on a trade-off between tone scales and detail resolution. For example, with text, the number of tone scales is not as important as providing a smooth text edge, whereas the opposite holds true for continuous tone images. Providing a single type of gray level halftone rendering technique to a document that contains two or more types of images may lead to the production of a document in which one or more of the different types of images are reproduced unsatisfactorily.

When scanning a document, image processing techniques have been applied to convert a gray scale image into an image representation which a printer can accept (either binary format or gray level format). In this scanning process, text areas, line drawing and halftone pictures are indistinguishable from each other, and all appear to be a gray scale image. An improper conversion process creates artifacts in the hardcopy such as a jagged boundary in the text area, or a Moire pattern in the halftone region. To overcome this, intelligent processes have been developed to segment the image into different regions of text, line drawing, and picture. Different conversion processes for the individual segments were then applied to these segments to restore the original document. However, these segmentation and conversion processes unduly complicate the digital copying process.

There is a need for a unified rendering method and apparatus using gray level printing that will satisfactorily reproduce an image that contains text, line drawing, halftone and/or continuous tone regions, with different gray dot representations selected for the specific regions. There is a need for a method and apparatus which does this without a need to "know" where is the text region, the halftone region or the continuous tone region, and which overcomes artifacts such as a jagged text boundary or a Moire pattern in the halftone.

SUMMARY OF THE INVENTION

This and other needs are met by the present invention which provides a method of reproducing an original image comprising the step of scanning an original image to digitize the image so as to produce a digitized image signal, and collecting statistical information of dot regions from the digitized image signal. For each dot region of the digitized image signal, a dot type is selected to render that dot region in accordance with the statistical information, the dot type being either a mixed dot type or a fixed threshold type. A printer is controlled to print the digitized image signal by rendering the dot regions in accordance with the selected dot type for each dot region.

The earlier stated need is also met by an arrangement constructed in accordance with an embodiment of the present invention which provides an arrangement for reproducing an original image, comprising a scanner which scans and digitizes the original image into pixels, a controller coupled to the scanner to receive the digitized original image, and which produces a first signal corresponding to said digitized original image, and a printer coupled to the controller to receive the first signal and which produces on a recording medium a reproduction of the original image. The controller includes: means for collecting statistical information of dot regions from the first signal; means for selecting for each dot region of the first signal a dot type to render that dot region in accordance with the statistical information, the dot type being either a mixed dot type or a fixed threshold type; and means for controlling a printer to print the reproduction of the original image by rendering the dot regions of the first signal in accordance with the selected dot type for each dot region.

The fixed threshold type dot provides very good rendering of text and halftone, and will not cause Moire in the halftone while producing a smooth text boundary. The mixed dot provides very good rendering for continuous tone regions. By collecting statistical information and then locally selecting the appropriate dot type from between the fixed threshold type and the mixed dot type, a superior reproduction of an image that contains different types of image regions, such as text, halftone and continuous tone regions is achieved.

In another embodiment of the present invention, the selection is made between a partial dot type and the mixed dot type, instead of between fixed threshold and mixed dot type. As with the fixed threshold type, the partial dot type provides very good rendering of text and halftone, and will not cause Moire in the halftone while producing a smooth text boundary.

Other objects, advantages and novel features of the present invention will become apparent from the following detailed description of the invention when considered in conjunction with the accompanying drawings.

BRIEF DESCRIPTION OF THE DRAWINGS

FIG. 3 illustrates an exemplary 3-bit gray halftone dot layout according to a full dot type embodiment of the present invention.

FIG. 6 shows a 3-bit gray halftone dot layout according to a partial dot type embodiment of the present invention.

FIG. 7 shows a 3-bit gray halftone dot layout according to a mixed dot type embodiment of the present invention.

FIG. 8 shows a 4-bit gray halftone dot layout according to a mixed dot type embodiment of the present invention.

FIG. 9 illustrates a thresholding mask for a 4-bit gray halftone dot layout according to a mixed dot type embodiment of the present invention.

FIG. 10 illustrates a thresholding mask for a 4-bit gray halftone dot layout according to a fixed threshold dot type embodiment of the present invention.

DETAILED DESCRIPTION OF THE DRAWINGS

Figures 1, 2:
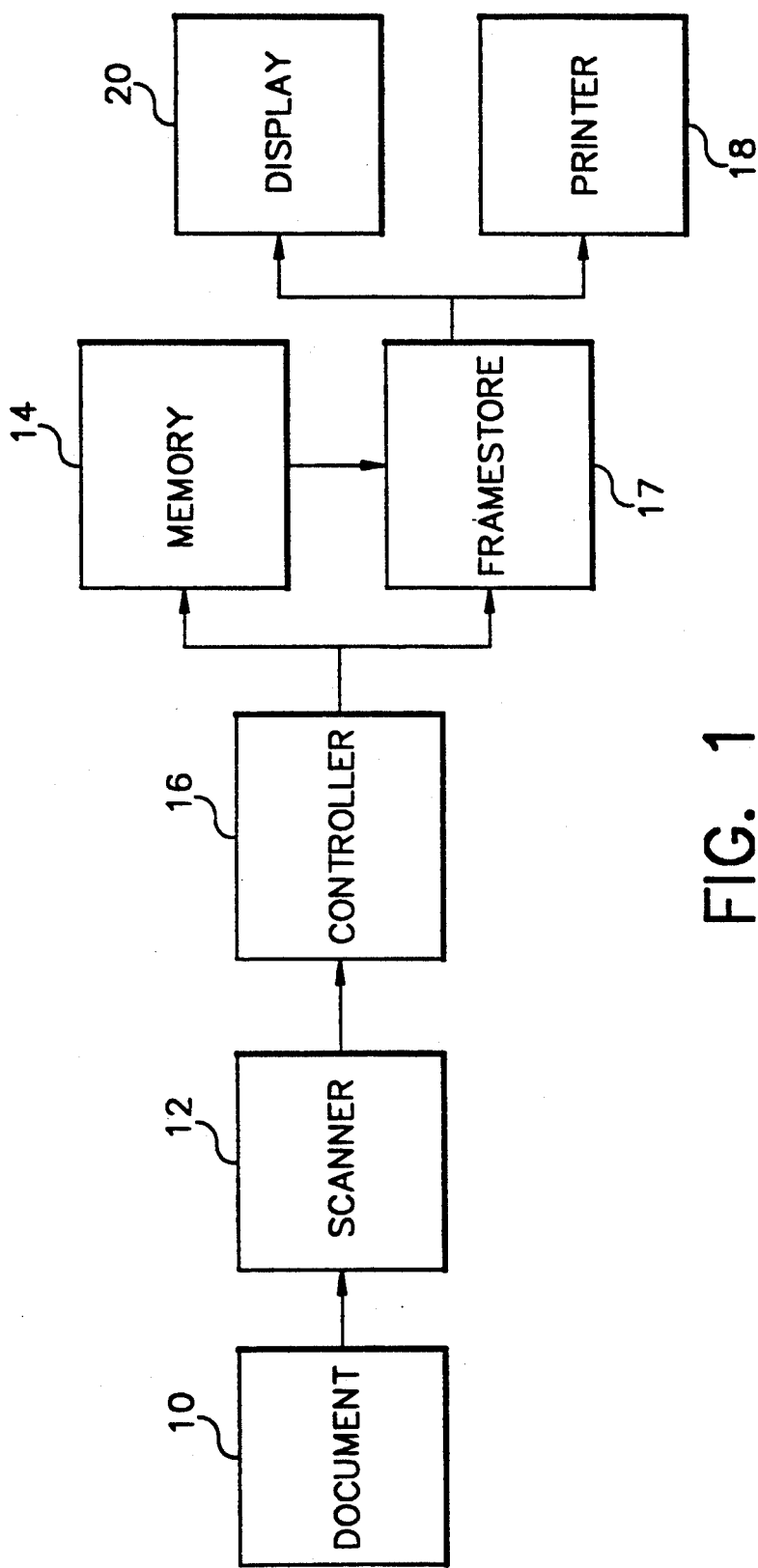
FIG. 1 shows a block diagram of an arrangement for reproducing an image, constructed in accordance with an embodiment of the present invention.
FIG. 2 shows an example of a 4×4 cell with indications of gray level for each pixel.

FIG. 1 illustrates an arrangement which reproduces a document. The document 10 can contain different types of images on the same document. For example, document 10 may contain both text and continuous tone areas, and may also contain halftone areas.

The document 10 is scanned in and digitized by a conventional scanner 12, which operates to provide digital signals representative of the densities of the areas of the document 10 corresponding to a pixel. These signals are sent to a memory (or buffer) 14. Under the direction of a controller 16, these signals may be modified and provided as gray level signals through a framestore 17 to a printer 18 and/or a display 20 for each pixel. The printer 18 and/or display 20 will then reproduce the document 10 by energizing each of the individual pixels according to the gray levels as modified (or not modified) by the controller 16. The memory 14, the controller 16, the framestore 17, the printer 18 and the display 20 are of conventional hardware design.

The controller 16 of the present invention operates to modify the gray level that is to be printed for a pixel in dependence on the local contrast. In providing a gray level signal for a specific pixel to be printed, the controller 16 will select between a "mixed dot" type rendering technique and a "fixed threshold" type rendering technique. Before describing the selection process, these two rendering techniques will now be discussed.

In gray level printing, each pixel has the capability to render several different dot sizes, and thus different gray levels. However, instead of simply providing each pixel with an independent gray level, several pixels may be organized together to form a super-pixel, or cell. Each of the pixels in a cell is then provided with a gray level. The human visual response integrates the various gray levels of the individual pixels in the cell to a single perceived gray level for the cell. This is similar to the basic concept of binary halftoning. The number of tone scales for a cell is increased greatly, however, due to the number of different gray levels available for each pixel. For example, instead of only the two levels provided in binary halftoning for each pixel, eight levels can be provided with gray level printing for each pixel in a cell (3 bits/pixel). When the cell is made up of 4×4 pixels, for example, the gray level printing allows 121 different gray shades to be rendered for that cell. An example of a 4×4 cell 28 with numbers that represent gray levels for each pixel is shown in FIG. 2.

The formation of the dots in the pixels of a cell can be performed in a number of different manners to achieve different desired results. The dots can be formed as "full" dot, "partial" dot, or "mixed" dot to provide gray level halftoning.

FIG. 3 illustrates an example of a 3-bit gray halftone dot layout for a full dot type formation. Also illustrated are seven different pixel-dot sizes, corresponding to the sizes that each individual pixel-dot can obtain. There are 57 possible gray levels for the exemplary eight element cell 30 shown here. An example of the formation of a cell that is at gray level 12 will now be given.

The pixel circled in level 1, reference numeral 1, is formed to dot-size 1 in level 1. (Only one cell will be described, although the pixels of other cells will be changed according to the same layout, as shown in FIG. 3). The dot at this circled pixel grows larger and larger as the levels increase from level 1 to level 2 all the way to level 7. One can see that this pixel increases in value from 1 to 7 as the levels increase. If the desired gray level for the cell 30 was 7, then the formation of dots would be completed once the circled pixel has reached the dot-size of 7 in level 7. In this example, however, the gray level for the cell 30 is desired to be 12. At gray level 7, the circled pixel has reached its maximum dot-size, so that a dot at another pixel must now start forming. This dot starts forming at the pixel indicated with a square around it in level 1, with the numeral 8.

Figures 4, 5:
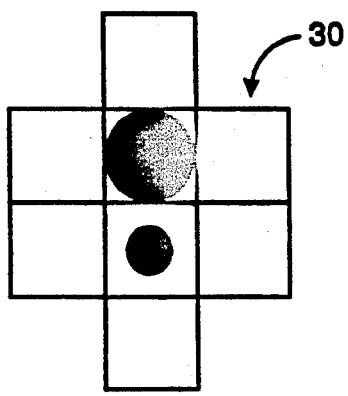
FIG. 4 shows a cell with dots that have been formed.
FIG. 5 illustrates an exemplary halftone dot mask.

The dot formation process continues, with the dot at this second pixel growing larger and larger as the levels again increase from level 1 to level 5. The formation process stops at level 5, since the pixel has now reached the value of 12. The halftone cell 30 now contains, as seen in FIG. 4, a dot of dot-size 7, and a dot of dot-size 5. The extension of this formation process to 57 gray levels is easy to see from this example.

The full dot type process thus involves forming dots at the highest priority pixels to their maximum allowable dot-size before beginning the formation of the dots at the next highest priority pixels. An exemplary halftone dot mask 32 with pixel priorities indicated is shown in FIG. 5. Different matrix sizes, cell shapes and priorities can be used for the cells than that illustrated in FIG. 3, without departing from the spirit and scope of the present invention.

In the electrophotographic process, the full dot type formation process is favored because it forms stable dots and exhibits less granularity (halftone printing noise). Another method which carries more information detail than full dot, but at the cost of less stable dots, is the partial dot type, described below.

A 3-bit gray halftone dot layout for the partial dot type formation process is shown in FIG. 6. In this process, the cell 34 is built by providing a dot of the same size to each pixel in the cell to the extent possible, before building up the dot at any particular pixel to the next larger size. Thus, for a gray level of 6 for the cell 34, the circled pixel in level 1 would have a dot formed at that pixel with a dot-size of 1. For larger gray levels, for example gray level 13, each of the pixels in the cell 34 would be built up to at least dot-size of 1. The pixels indicated with a square around them in level 2 would be built up to have a dot-size of 2.

The partial dot formation process can thus be seen to spread out the information over the cell, and therefore carries more information detail than the full dot. It does suffer from less stable dots and more granularity, however.

The mixed dot type, discussed below, combines the merits of both the full dot and the partial dot types in gray level halftoning. A number of different processes can be provided to combine the full dot type and the partial dot type, with the specific mixed dot type being chosen based on which renders an image with more smoothness, less graininess, and more image details. Suggested strategies are: 1) build small stable dots in the highlight (toe) region; 2) keep tone response linear in the mid-tone region; 3) reduce dot structure in the shadow (shoulder) region and render more details. Based on these considerations, a specific mixed dot type can be chosen by one of ordinary skill in the art to optimize stable dots, more image detail and less graininess.

An example of a specific mixed dot type 3-bit gray halftone dot layout is illustrated in FIG. 7. As can be seen, until gray level 41 is reached, the pixels are constrained from growing beyond dot-size of 5. The pixels grow in a full dot type process, with the pixel circled growing to a dot-size of 5, with the pixel that is squared then starting to grow in size. Once all of the pixels in the cell have attained a dot-size of 5, corresponding to gray level 40, the cell then increases in gray level by using a partial dot type process. In other words, each of the pixels in the cell must grow to a dot-size of 6 before any of the pixels begins growing to a dot-size of 7.

An example of a 4-bit gray halftone dot layout for mixed dot type is illustrated in FIG. 8. The formation of the dots is the same in concept to that illustrated in FIG. 7. Because there are 15 dot sizes available for each pixel, 121 gray levels for an eight element cell are obtainable.

Another type of rendering technique is a fixed threshold method. In this method each individual pixel is rendered with only limited tone scales. For example, 4 bits/pixel renders 16 different tone shades. The fixed threshold type renders the highest resolution among the various types, and an edge can be rendered more accurately down to each pixel. The fixed threshold type renders an image with even higher sharpness than the partial dot type since it is not limited by the cell size as is the partial dot type. The problem with the fixed threshold type is that it has less tone scales, so that a false contour could easily be seen in the rendered image. However, the fixed threshold type will provide excellent rendering results on text and halftone originals.

Although any one of the three dot types (full, partial or mixed) could be used to produce a satisfactory continuous tone image, the mixed dot type is the best choice for continuous tone rendering. For scanned text and halftone, the full dot type creates a screen structure in the background of text and a Moire pattern in the halftone. The mixed dot type also creates a screen structure in the background of text and creates a Moire pattern in the halftone, though weaker than that created by the full dot type. As stated above, the fixed threshold type renders well on both text and halftone. The unified rendering technique of the present invention uses both fixed threshold type and mixed dot types according to local image content so that text, halftone and continuous tone images are all reproduced well.

A 4-bit mixed dot type thresholding mask is illustrated in FIG. 9, while the fixed threshold type thresholding mask is shown in FIG. 10. These thresholding masks are derived from a dot layout, such as shown in FIG. 8 for the mixed dot type. (The dot layout for the fixed threshold type is not shown, only the derived thresholding mask).

Figure 12:
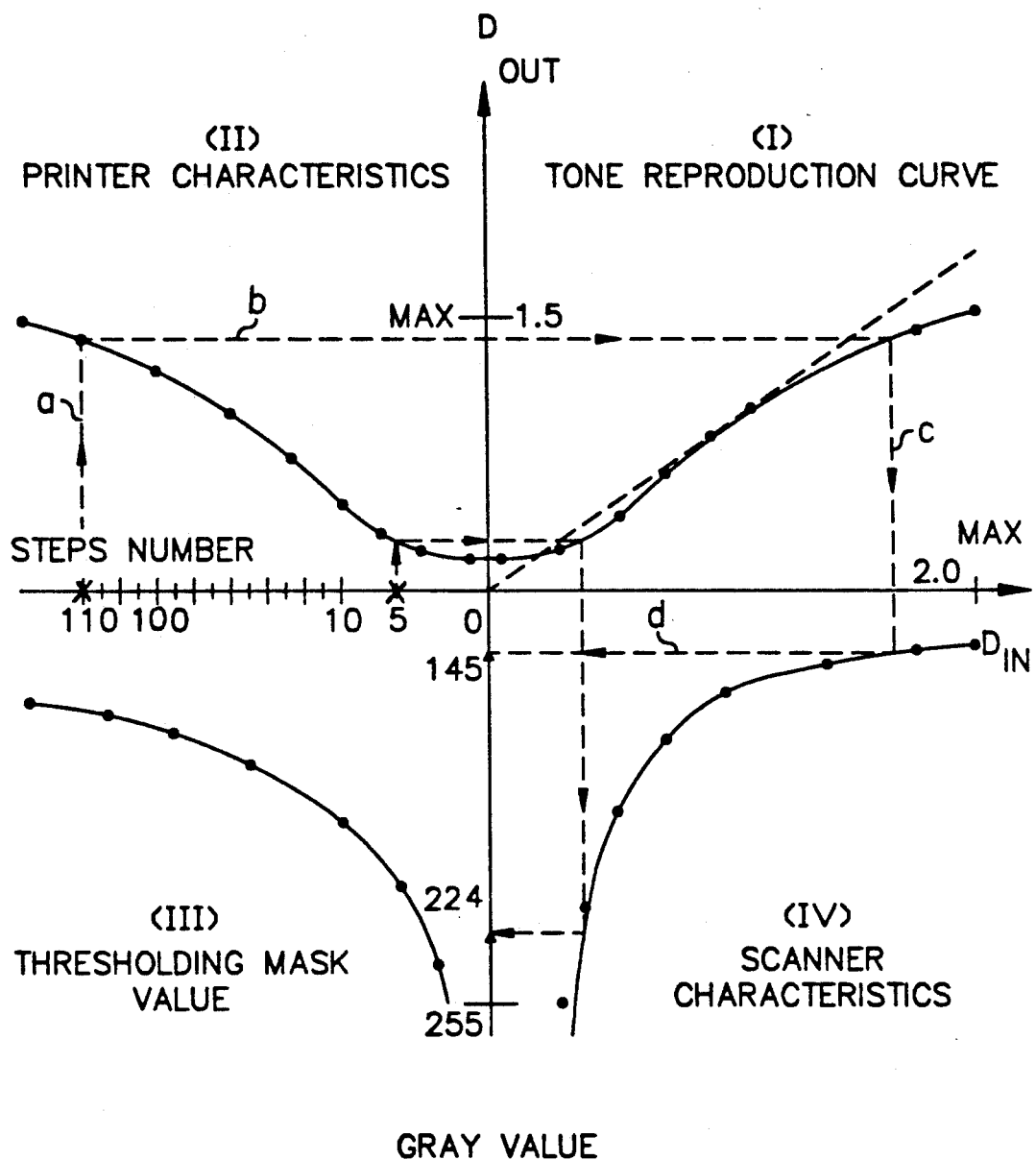
FIG. 12 shows a tone reproduction control chart.

The thresholding masks are derived from the dot layouts using a tone reproduction control chart, such as shown in FIG. 12. The tone reproduction chart has four quadrants. The first quadrant (I) contains the input and output density of a specific tone reproduction curve, which specifies the gamma or the contrast of the image to be reproduced. The second quadrant (II) captures the characteristics of the gray level printing process. The fourth quadrant (IV) preserves the characteristics of the scanner, which converts the density to a gray value. The third quadrant (III) maps gray values into gray steps linking the quadrants IV, I and II together.

To determine a thresholding mask value using this chart, the step number of the dot sequence in the dot layout of a cell is replaced by a gray value. For example, for step number 110 (found in threshold level 14 of FIG. 8 for the mixed dot type) the mapping along arrows a, b, c, and d provides the gray value of 12. Similarly, for step number 5, the gray value maps to 224. (The values of the step number and the gray values are inversely related). In this manner, the thresholding masks of FIGS. 10 and 11 are derived.

Figure 11:
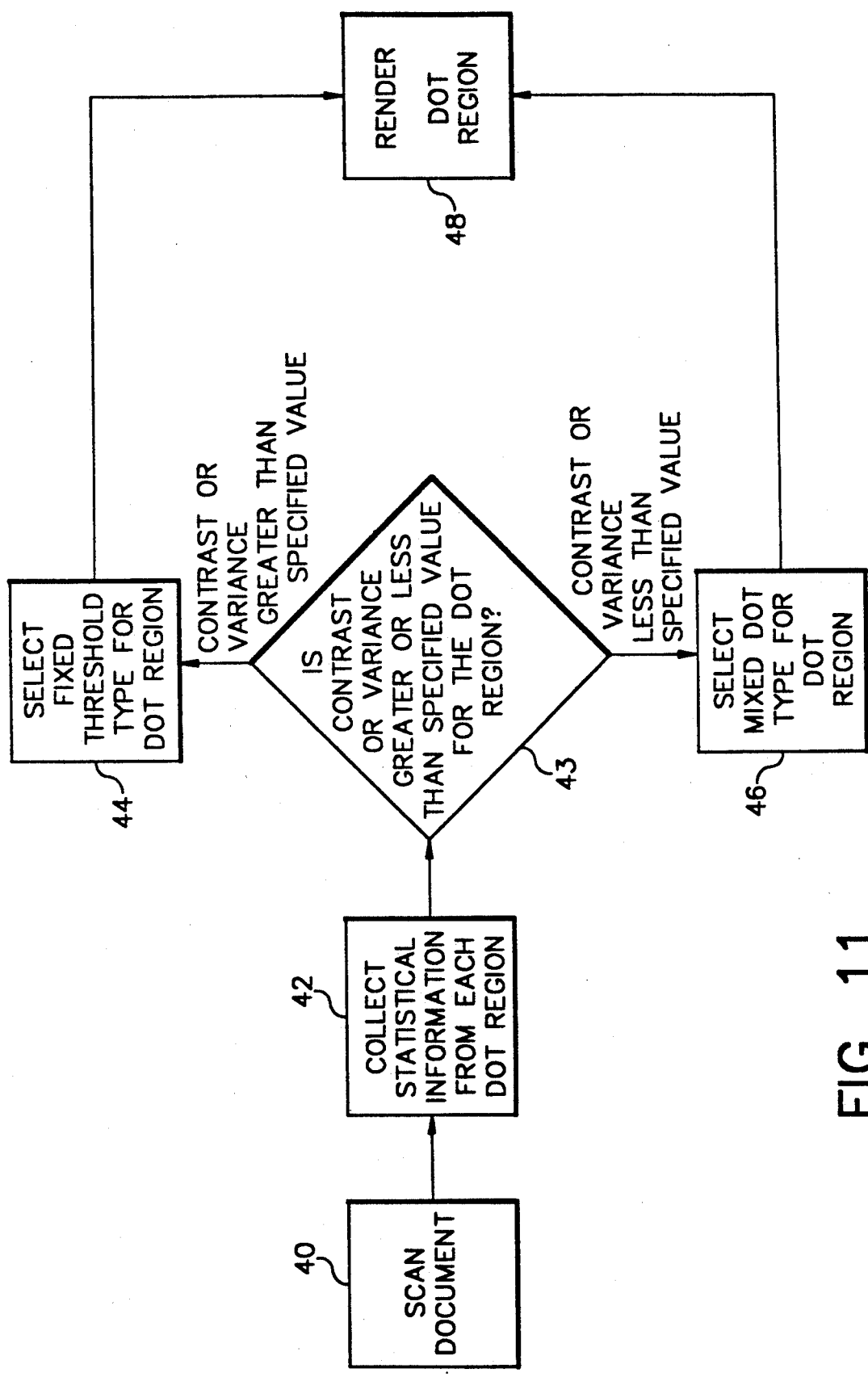
FIG. 11 shows a method for unified image rendering in accordance with an embodiment of the present invention.

An exemplary embodiment of a method for unified image rendering is illustrated in FIG. 11. A document 10 is scanned in step 40, using the scanner 12 as shown in FIG. 1. The controller 16 collects statistical information from each dot region (e.g. 4×4 pixels) in step 42. This statistical information can include contrast, variance, variation or roughness, for example. The contrast is defined as the difference between local maximum intensity and local minimum intensity. The variation is defined as the average of the intensity difference between the nearest neighboring pixels. Techniques for finding the contrast or the variation are well known to those of ordinary skill in the art.

The present invention determines in step 43 whether the contrast or variance of a dot region is greater than a specified value in step 43. If the contrast or variance is greater than the value, a fixed threshold type dot is selected for that dot region (step 44), otherwise, a mixed dot is selected (step 46). Finally, the image is reproduced by the printer 18 in step 48, with the specific dot region rendered in either the selected fixed threshold type or mixed type dot.

Thus, in the present invention, a fixed threshold type dot is rendered for text and halftone, since text and halftone are usually higher contrast in nature. This will not cause the Moire pattern in the halftone and will produce a smooth text boundary. The mixed dot, the best of the different dot types for continuous tone images, is rendered for the continuous tone region.

Collecting the statistical information and locally selecting the appropriate dot type from between a fixed threshold type and a mixed dot type provides superior reproduction of an image that contains different types of image regions, such as text, halftone and continuous tone regions.

Figure 13:
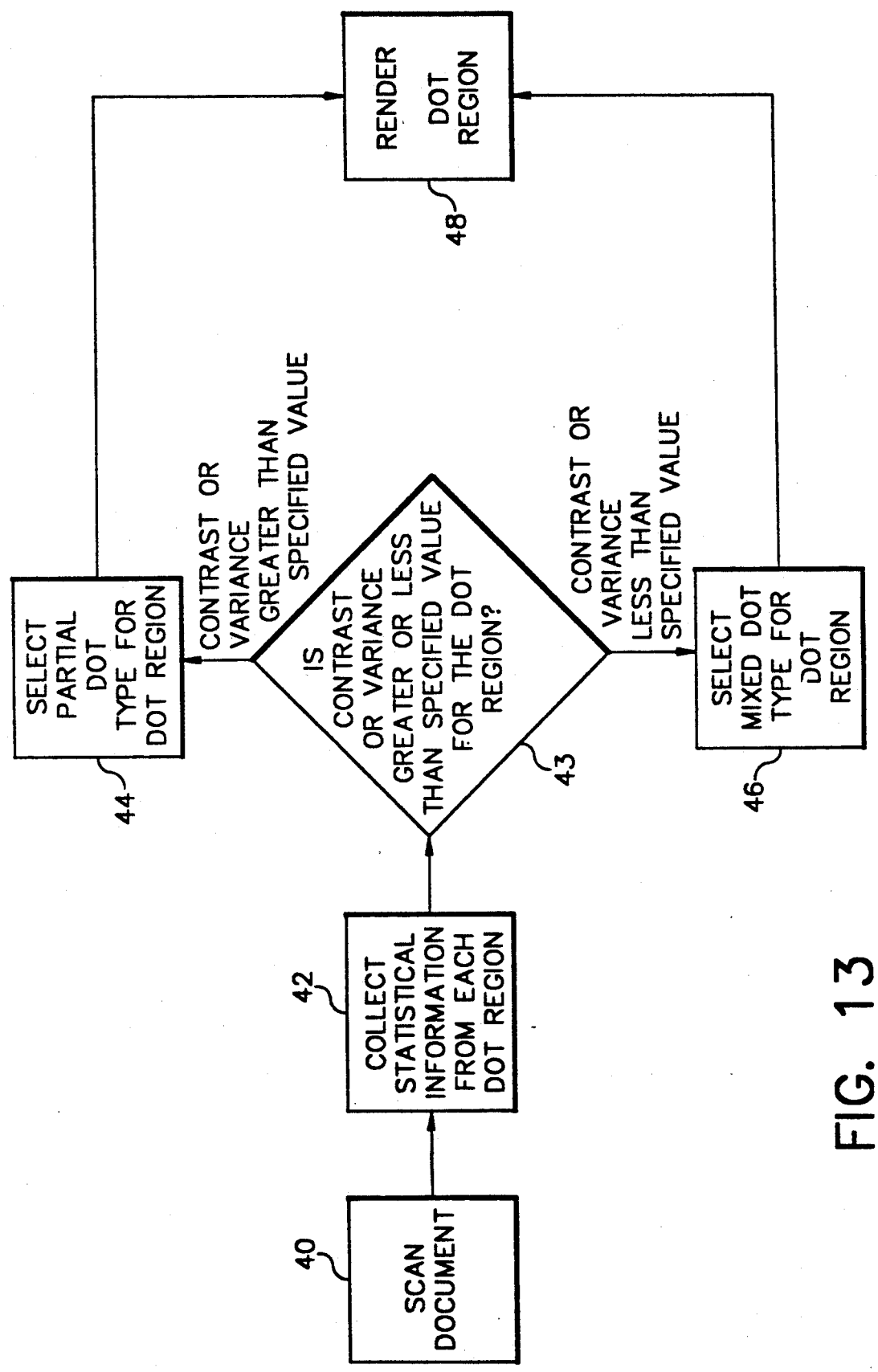
FIG. 13 shows a method for unified image rendering in accordance with another embodiment of the present invention.

Another exemplary embodiment of a method for unified image rendering is illustrated in FIG. 13. This method is the same as that shown in FIG. 11, except that if the contrast or variance is greater than the value, a partial dot is selected for that dot region (step 44), otherwise, a mixed dot is selected (step 46).

Thus, in this embodiment of the present invention, a partial dot is rendered for text and halftone, since text and halftone are usually higher contrast in nature. As with the fixed threshold type, the partial dot type will not cause the Moire pattern in the halftone and will produce a smooth text boundary. The mixed dot, the best of the different dot types for continuous tone images, is still rendered for the continuous tone region in this embodiment of the present invention.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed:

1. A method of reproducing an original image, comprising:
    scanning an original image to digitize the image so as to produce a digitized image signal;
    collect statistical information of dot regions from the digitized image signal;
    for each dot region of the digitized image signal, selecting a dot type to render that dot region in accordance with the statistical information, the dot type being either a mixed dot type or a fixed threshold type; and
    controlling a printer to print the digitized image signal by rendering the dot regions in accordance with the selected dot type for each dot region.

2. The method of claim 1, wherein the statistical information collected for a dot region includes information relating to at least one of contrast, variance, variation or roughness for that dot region.

3. The method of claim 2, wherein the fixed threshold type is selected for dot regions in which the contrast or variance is above a specified value, and the mixed dot type is selected for dot regions in which the contrast or variance is below a specified value.

4. An arrangement for reproducing an original image, comprising:
    a scanner which scans and digitizes the original image into pixels;
    a controller coupled to the scanner to receive the digitized original image, and which produces a first signal corresponding to said digitized original image; and
    a printer coupled to the controller to receive said first signal and which produces on a recording medium a reproduction of the original image;
    wherein said controller includes:
        means for collecting statistical information of dot regions from the first signal;
        means for selecting for each dot region of the first signal a dot type to render that dot region in accordance with the statistical information, the dot type being either a mixed dot type or a fixed threshold type; and
        means for controlling a printer to print the reproduction of the original image by rendering the dot regions of the first signal in accordance with the selected dot type for each dot region.

5. A method of reproducing an original image, comprising:

scanning an original image to digitize the image so as to produce a digitized image signal;

collect statistical information of dot regions from the digitized image signal;

for each dot region of the digitized image signal, selecting a dot type to render that dot region in accordance with the statistical information, the dot type being either a mixed dot type or a partial dot type; and controlling a printer to print the digitized image signal by rendering the dot regions in accordance with the selected dot type for each dot region.

6. The method of claim 5, wherein the statistical information collected for a dot region includes information relating to at least one of contrast, variance, variation or roughness for that dot region.

7. The method of claim 6, wherein the fixed threshold type is selected for dot regions in which the contrast or variance is above a specified value, and the mixed dot type is selected for dot regions in which the contrast or variance is below a specified value.

8. An arrangement for reproducing an original image, comprising:

a scanner which scans and digitizes the original image into pixels;

a controller coupled to the scanner to receive the digitized original image, and which produces a first signal corresponding to said digitized original image; and a printer coupled to the controller to receive said first signal and which produces on a recording medium a reproduction of the original image;

wherein said controller includes:

means for collecting statistical information of dot regions from the first signal;

means for selecting for each dot region of the first signal a dot type to render that dot region in accordance with the statistical information, the dot type being either a mixed dot type or a partial dot type; and means for controlling a printer to print the reproduction of the original image by rendering the dot regions of the first signal in accordance with the selected dot type for each dot region.

* * * * *